United States Patent

[11] 3,607,884

[72] Inventor Le Roy S. Forney
 Metuchen, N.J.
[21] Appl. No. 806,299
[22] Filed Mar. 11, 1969
[45] Patented Sept. 21, 1971
[73] Assignee Mobil Oil Corporation

[54] PREPARATION OF 5-CARBOXYPHTHALIDE IN LIQUID SODIUM TRIOXIDE
1 Claim, No Drawings

[52] U.S. Cl........................................................ 260/343.3
[51] Int. Cl..................................................... C07d 5/40
[50] Field of Search........................................ 260/343.3

[56] References Cited
UNITED STATES PATENTS
3,296,276   1/1967   Sherlock ..................... 260/343.3

*Primary Examiner*—Alton D. Rollins
*Assistant Examiner*—Anne Marie T. Tighe
*Attorneys*—Oswald G. Hayes, Andrew L. Gaboriault and Hastings S. Trigg

ABSTRACT: 5-Carboxyphthalide is prepared by reacting a concentrated solution of terephthalic acid in liquid $SO_3$ with formaldehyde. 5-Carboxyphthalide derivatives have been disclosed as lubricating oil additives in U.S. Pat. No. 3,261,780.

PREPARATION OF 5-CARBOXYPHTHALIDE IN LIQUID SODIUM TRIOXIDE

BACKGROUND OF THE INVENTION

1. Field of the Invention

This invention is concerned with a process for preparing 5-carboxyphthalide.

2. Description of the Prior Art

In U.S. Pat. Nos. 3,113,148; 3,257,452; and 3,340,293 and in J. Org. Chem. 26, 4731 (1961), there is disclosed the condensation of a phthalic acid with formaldehyde in 10–65 percent oleum in a 2:1 molar ratio. The reported product was a tetracarboxydiphenyl methane.

These patents mention that the condensation can be carried out in liquid (100 percent) $SO_3$, but that it is necessary to use pressure and pressure equipment to maintain the $SO_3$ in the liquid phase. It is the discovery of this invention that using a concentrated solution of terephthalic acid in liquid $SO_3$, it can be reacted with formaldehyde in a 1:1 molar ratio at atmospheric pressure to produce 5-carboxyphthalide.

SUMMARY OF THE INVENTION

This invention provides a process for the production of 5-carboxyphthalide that comprises reacting, at atmospheric pressure, terephthalic acid dissolved in liquid $SO_3$ with formaldehyde in a 1:1 molar ratio at a temperature between about 120° C. and about 180° C.; the amount of liquid $SO_3$ being no more than 90 cc. per 100 g. terephthalic acid.

DESCRIPTION OF SPECIFIC EMBODIMENTS

The compound produced in the process of this invention is 5-carboxyphthalide, which has the structural formula:

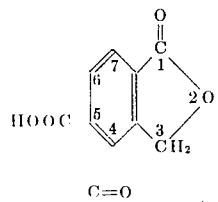

It has been prepared by hydrogenation of trimellitic anhydride.

The terephthalic acid reactant can be prepared by several known methods, such as by catalytic oxidation of *p*-xylene. It is readily available commercially.

The form of formaldehyde used is not a critical factor. Gaseous formaldehyde can be used, but a solid form is preferred. Suitable forms are paraformaldehyde, Trioxane, and trioxymethylene. Stoichiometrically, the terephthalic acid and formaldehyde react in a 1:1 molar ratio. In practice, however, up to one-third molar excess formaldehyde can be used. Up to about 2 moles formaldehyde per mole terephthalic acid have been used but there was formed a small amount of a byproduct, the ester of terephthalic acid with hydroxyacetic acid.

The solvent used in the process of this invention is liquid (100 percent) $SO_3$, a commercially available commodity. The use of pressure in this process is obviated by using the minimum amount of liquid $SO_3$ and still maintain sufficient fluidity that the reaction mixture can be stirred. The maximum amount of liquid $SO_3$ used is about 90 cc. per 100 g. terephthalic acid. Above this amount, pressure will be required to prevent evolution of $SO_3$ and to achieve the requisite reaction temperature.

The reaction has a temperature threshold of about 120° C., but temperatures of about 180° C. and higher have been used. Temperatures between about 120° C. and about 150° C. are preferred. The time of reaction can vary between about 0.5 hour and about 24 hours, but are normally about 1–2 hours.

At the end of the reaction, some of the $SO_3$ can be recovered by distillation means, if desired, but this is not necessary. Then, as shown in the specific working examples, the reaction mixture can be cooled and poured into an alcohol (e.g., methanol or ethanol) to precipitate product which is separated by filtration or decantation. In the case of alcohol, the product will be obtained in the form of the corresponding ester of 5-carboxyphthalide. This can be hydrolyzed by well-known methods, or saponified and acidified, to obtain the 5-carboxyphthalide. The product, however, can be poured into water to obtain the 5-carboxyphthalide directly. 5-carboxyphthalide may be purified by recrystalization from a suitable solvent, such as acetic acid.

EXAMPLE 1

Sulfur trioxide (180 ml., 4.3 mole "Sulfan") was slowly added to terephthalic acid (200 g., 1.2 mole) in a 1000 ml. flask equipped with a mechanical stirrer, thermometer, and reflux condenser. The addition was mildly exothermic. Formaldehyde (36 g., 1.2 mole "Trioxane") was added with stirring and external cooling (exothermic). The resultant slurry was heated to 130° C. and the temperature maintained for 15 minutes, during which time the solids dissolved to give a dark red solution. The mixture was cooled to 100° C. and more formaldehyde added (12 g., 0.4 mole). The temperature was raised to 130° C. and maintained another 105 minutes, then cooled to 100° C. and poured into 2 l. of stirred ethanol. This gave a heterogeneous mixture which became homogeneous on concentration of the solution to 800 ml. (pot temperature at this point—120° C.). Ice was added to dilute the mixture to 2 l. (exothermic) and cool the solution, precipitating the carboethoxyphthalide. Crude 5-carboethoxyphthalide was isolated by filtration, then slurried with water and bought to pH 4 by addition of NaOH to neutralize the residual sulfuric acid. The slurry was filtered and washed with water to give 213 g. of crude 5-carboethoxyphthalide as a light red-brown solid (86.2 percent of theoretical yield). Gas-liquid chromatography indicated that this crude product (m.p. 127°130° C.) consisted of 98.4 percent 5-carboethoxyphthalide and 1.6 percent diethyl terephthalate.

Following decolorizing over activated charcoal and recrystallization from ethanol, the material was received as a white solid, m.p. 147°148° C.

EXAMPLE 2

The reaction was conducted as in Example 1. However, the reaction mixture was slowly poured over ice and the aqueous slurry stirred vigorously. The crude product received by filtration was slurried with hot water to remove traces of residual sulfuric acid, then dried to recover 194 g. of 5-carboxyphthalide, m.p. 285°290° C. The filtrates were combined for continuous extraction with chloroform, which yielded an additional 5 g. of 5-carboxyphthalide, m.p. 265°285° to provide a total yield of 93 percent.

Esterification of the product with methanol-$BF_3$ gave 5-carbomethoxyphthalide, m.p. 166°–167°. *Anal.* —Calc'd. for $C_{10}H_8O$: C, 62.48; H, 4.20. Found: C, 63.57; H, 4.21. Saponification equivalent: Calc'd 96; Found, 96.05.

Esterification with ethanol-$BF_3$ gave the corresponding ethyl ester, m.p. 147.5°–148°. *Anal.* —Calc'd. for $C_{11}H_{10}O_4$: C, 64.05; H, 4.89. Found: C, 64.11; H, 4.86.

EXAMPLE 3

Terephthalic acid (10.7 g., 65 m. moles) was added to 100 percent $SO_3$ (46 g.) and the solution refluxed for 2 hours with stirring, to effect a homogeneous solution. Then the reflux condenser was exchanged for a distillation column, and $SO_3$ boiled off until the pot temperature reached 75° C., when solids began to appear in the mixture. The flask was cooled and formaldehyde ("Trioxane," 4.0 g., 130 m. moles) added. The solution was heated to 130° C. and the temperature maintained with stirring for one-half hour. After cooling to room temperature, the mixture was poured into methanol (150 ml.), the volume reduced to 50 ml. and the alcoholic solution poured into water (150 ml.). The resulting precipitate was filtered, slurried with water (2×250 ml., washings neutral to litmus) and dried overnight (85°/25° mm.). In this way 8.1 g. of solids were received (73 percent of theoretical yield), shown by gas-liquid chromatography to contain 93.7 percent 5-carbomethoxyphthalide and 6.3 percent dimethylterephthalate.

5-carboxyphthalide dissolves in basic solution as a difunctional acid. The corresponding hydrate, 2-hydroxymethylterephthalic acid, can be isolated from basic solution by careful adjustment of the PH. The 2-hydroxymethylterephthalic acid is stable to mild warming, but rapidly loses water on heating to 200° C., reconverting to 5-carboxyphthalide. The isolation of 2-hydroxymethylterephthalic acid has not been achieved prior to this report.

EXAMPLE 4

Acidification of the solution received from saponification of 5-carbomethoxyphthalide gave 2-hydroxymethylterephthalic acid, isolated by filtration and drying (85° C./20 mm.). It gave no phthalide C=O absorption at 5.70$\mu$ in the ir. *Anal.* Calc'd. for $C_9H_8O_5$: C, 55.10; H, 4.08 Found: C, 54.70, 54.88; H, 4.15 4.18. Differential gravimetric analysis indicated loss of water at 200° C. (Calc. wt. loss for $-H_2O$: 9.20 percent. Found: 10.21 percent) and melting at 296° C. (5-carboxyphthalide).

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

I claim:

1. A process for the production of 5-carboxyphthalide that comprises reacting, at atmospheric pressure, terephthalic acid dissolved in liquid $SO_3$ with formaldehyde in a 1:1 molar ratio at a temperature between about 120° C. and about 180° C.; the amount of liquid $SO_3$ being no more than 90 cc. per 100 g. terephthalic acid.

PO-1050
(5/69)

UNITED STATES PATENT OFFICE
CERTIFICATE OF CORRECTION

Patent No. 3,607,884     Dated September 21, 1971

Inventor(s) LeRoy S. Forney

It is certified that error appears in the above-identified patent and that said Letters Patent are hereby corrected as shown below:

Column 2, line 33, change "bought" to --brought--

Column 2, line 38, change "127°130°" to --127-130°--

Column 2, line 43, change "147°148°" to --147-148°--

Column 2, line 52, change "285°290°" to 285-290°--

Column 2, line 54, change "265°285°" to --265-285°--

Column 2, line 58, change "$C_{10}H_8O$:" to --$C_{10}H_8O_4$:--

Column 3, line 4, change "85°/25° mm." to --85°/25 mm.--

In the title, "SODIUM" should be --SULFUR--

Signed and sealed this 25th day of April 1972.

(SEAL)
Attest:

EDWARD M. FLETCHER, JR.
Attesting Officer

ROBERT GOTTSCHALK
Commissioner of Patents